United States Patent
Xia et al.

(10) Patent No.: US 8,014,669 B2
(45) Date of Patent: Sep. 6, 2011

(54) IN-CHANNEL RESIDUAL CHROMATIC DISPERSION MEASUREMENT

(75) Inventors: Tiejun J. Xia, Richardson, TX (US); Glenn Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 927 days.

(21) Appl. No.: 11/957,720

(22) Filed: Dec. 17, 2007

(65) Prior Publication Data
US 2009/0154938 A1    Jun. 18, 2009

(51) Int. Cl.
*H04B 10/08* (2006.01)
*H04B 17/00* (2006.01)

(52) U.S. Cl. ................... 398/29; 398/9; 398/25

(58) Field of Classification Search ............... 398/9, 25, 398/29, 84, 136, 147, 148, 149, 150, 158, 398/159, 192, 194, 208
See application file for complete search history.

(56) References Cited

U.S. PATENT DOCUMENTS

| 4,799,790 | A | | 1/1989 | Tsukamoto et al. |
| 5,969,806 | A | * | 10/1999 | Bergano ............. 356/73.1 |
| 6,333,941 | B1 | | 12/2001 | Hung |
| 7,292,790 | B1 | | 11/2007 | Sardesai |
| 2002/0018213 | A1 | * | 2/2002 | Ibukuro et al. ......... 356/484 |
| 2009/0003837 | A1 | * | 1/2009 | Piciaccia et al. ......... 398/158 |
| 2009/0116786 | A1 | * | 5/2009 | Little et al. ............. 385/27 |

OTHER PUBLICATIONS

Notification of Transmittal of the International Search Report and the Written Opinion of the International Searching Authority, or the Declaration corresponding to PCT/US 08/84516, Jan. 23, 2009, 10 pages.

* cited by examiner

*Primary Examiner* — Ken Vanderpuye
*Assistant Examiner* — Daniel Dobson

(57) ABSTRACT

A system generates optical pulses, that include two frequencies within one optical channel, at a first end of an optical link, and receives the optical pulses at a second end of the optical link. The system also sets a frequency difference for the two frequencies of the optical pulses, calculates a relative group delay difference for the two frequencies of the optical pulses, and calculates a residual chromatic dispersion of the channel based on the frequency difference and the calculated relative group delay difference.

18 Claims, 12 Drawing Sheets

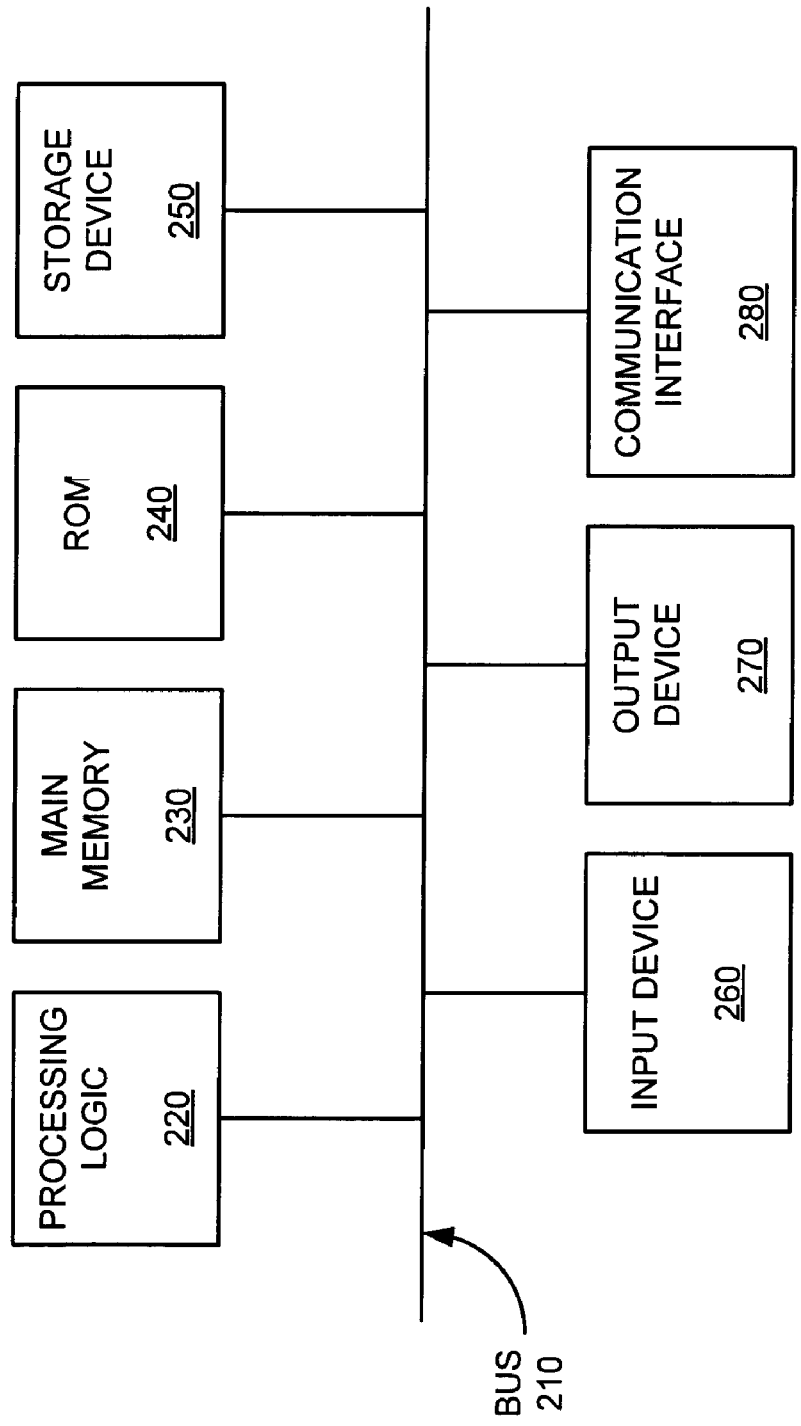

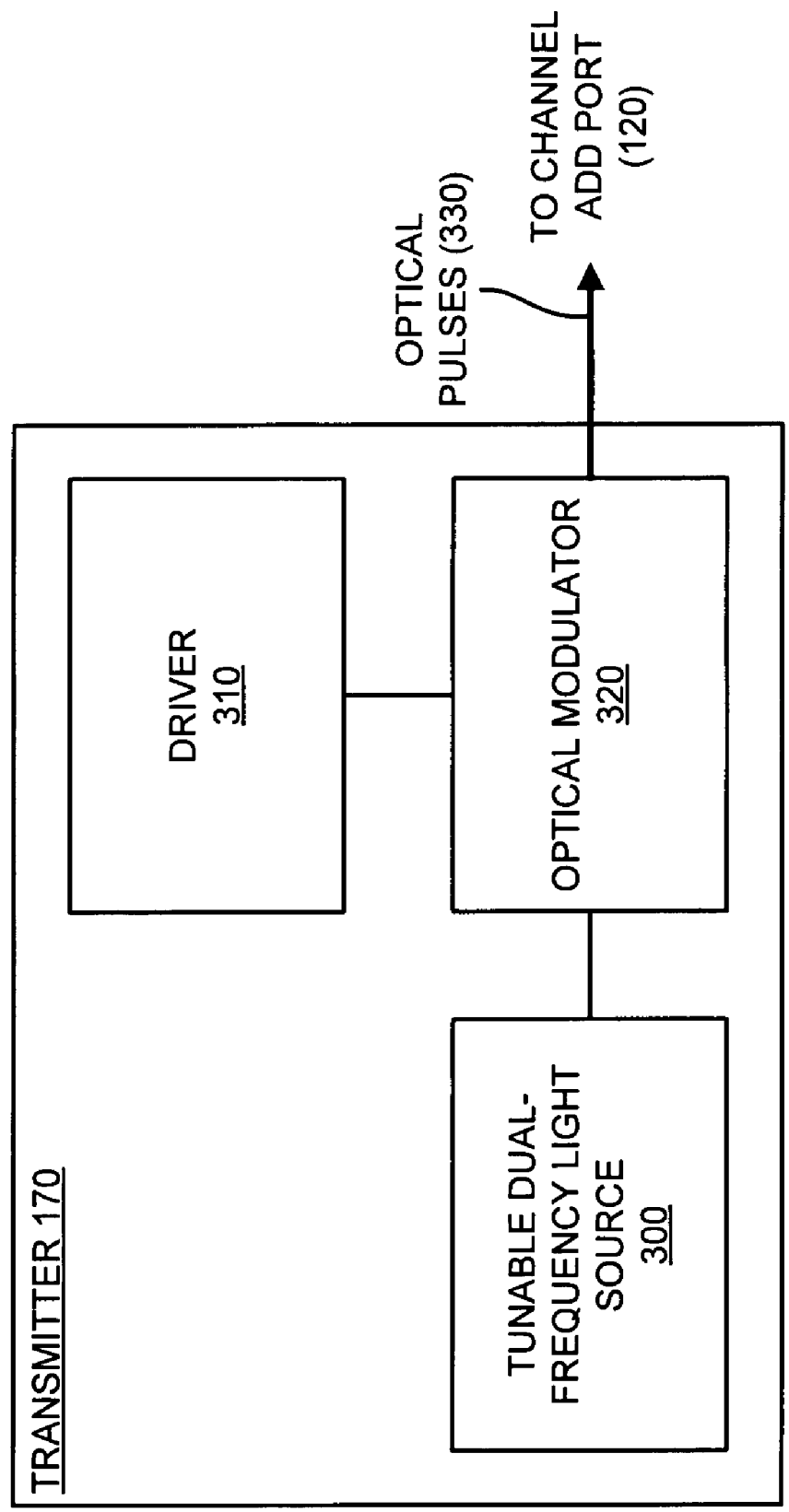

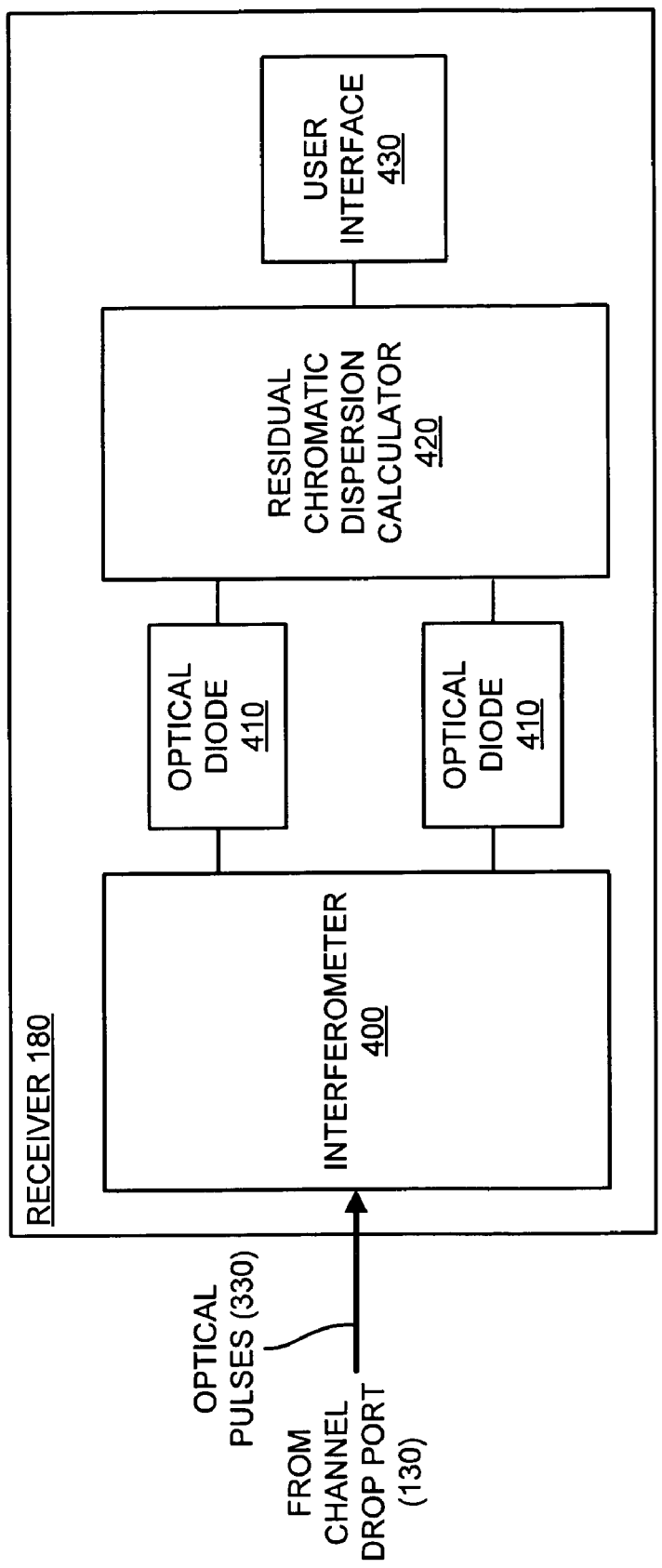

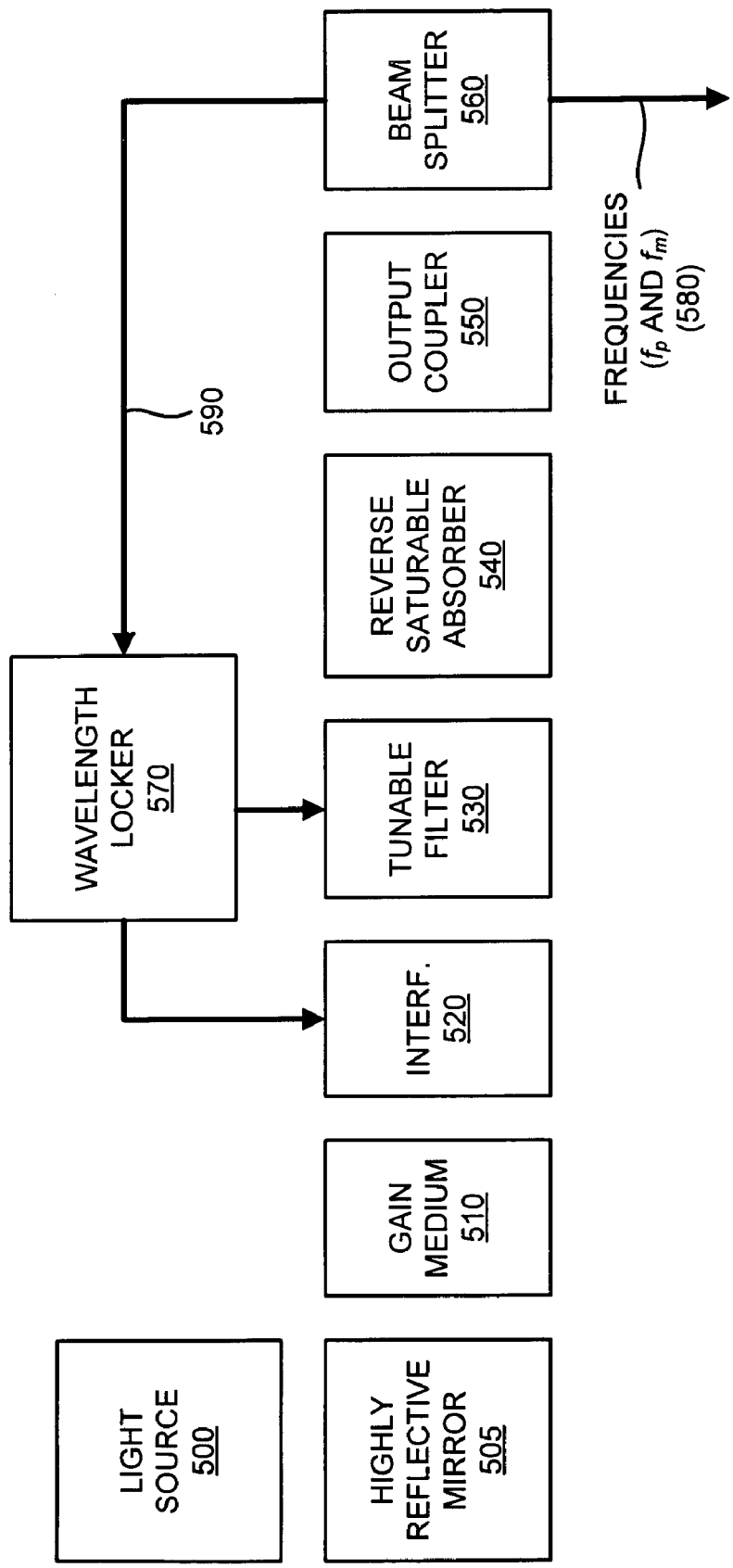

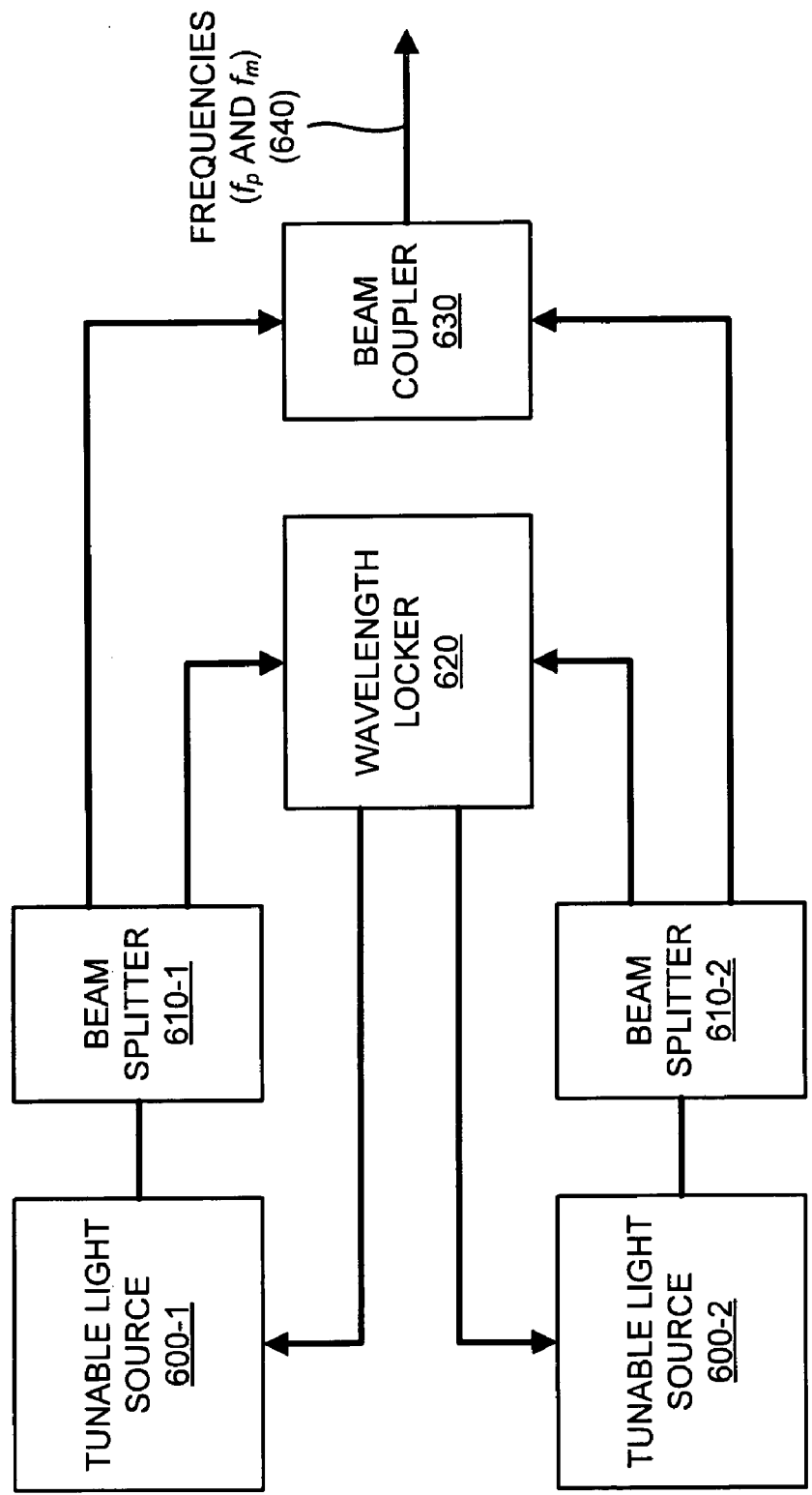

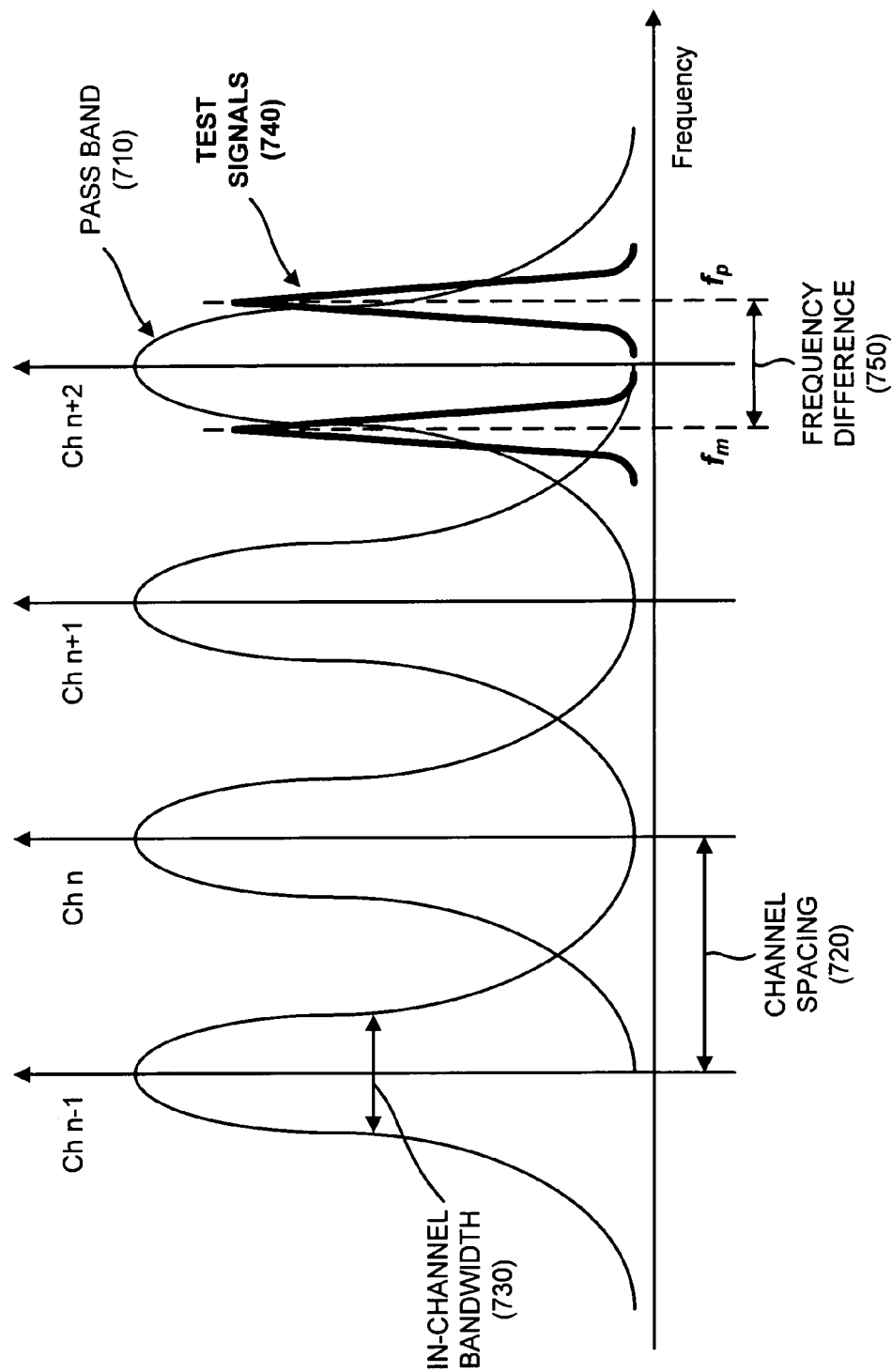

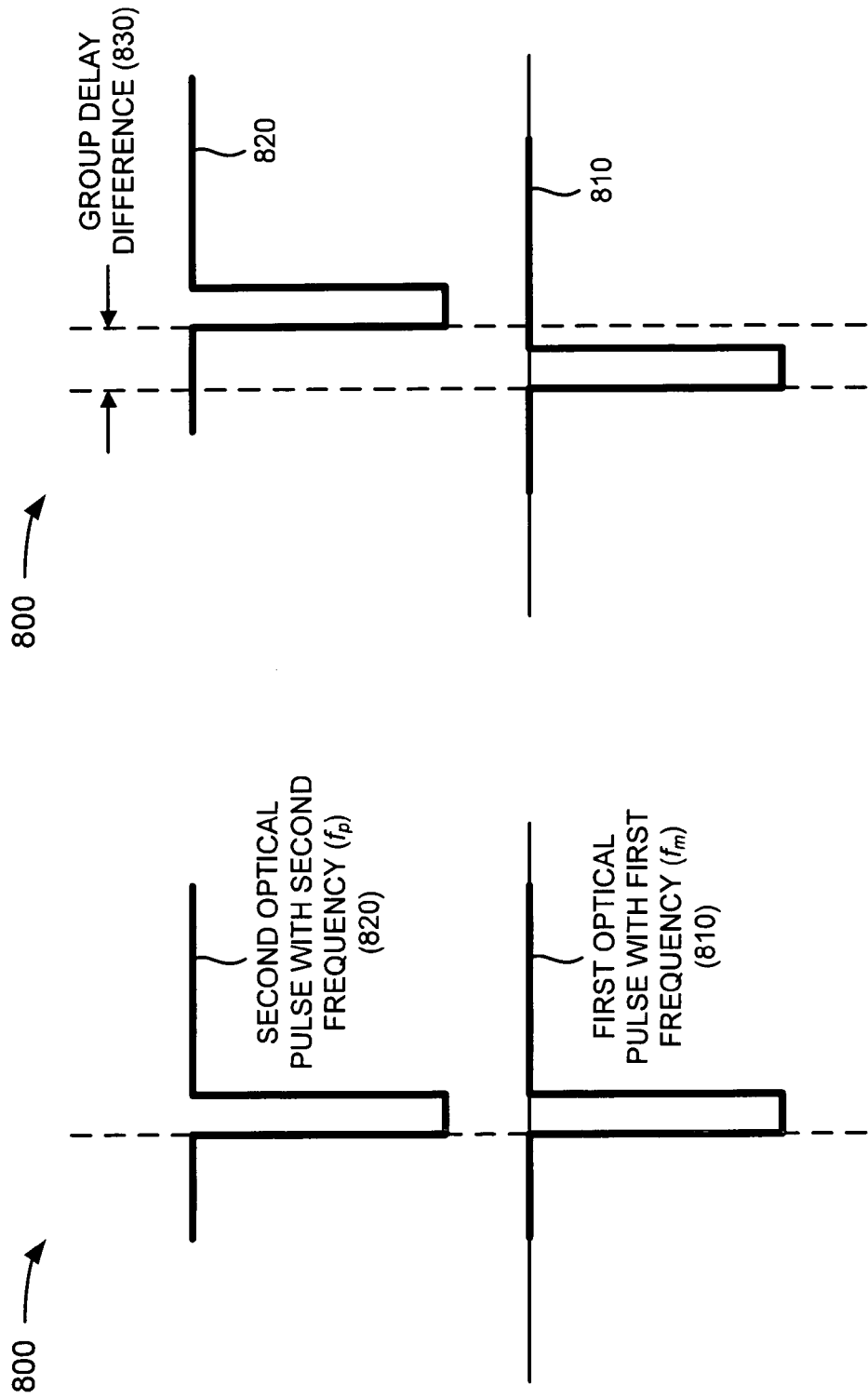

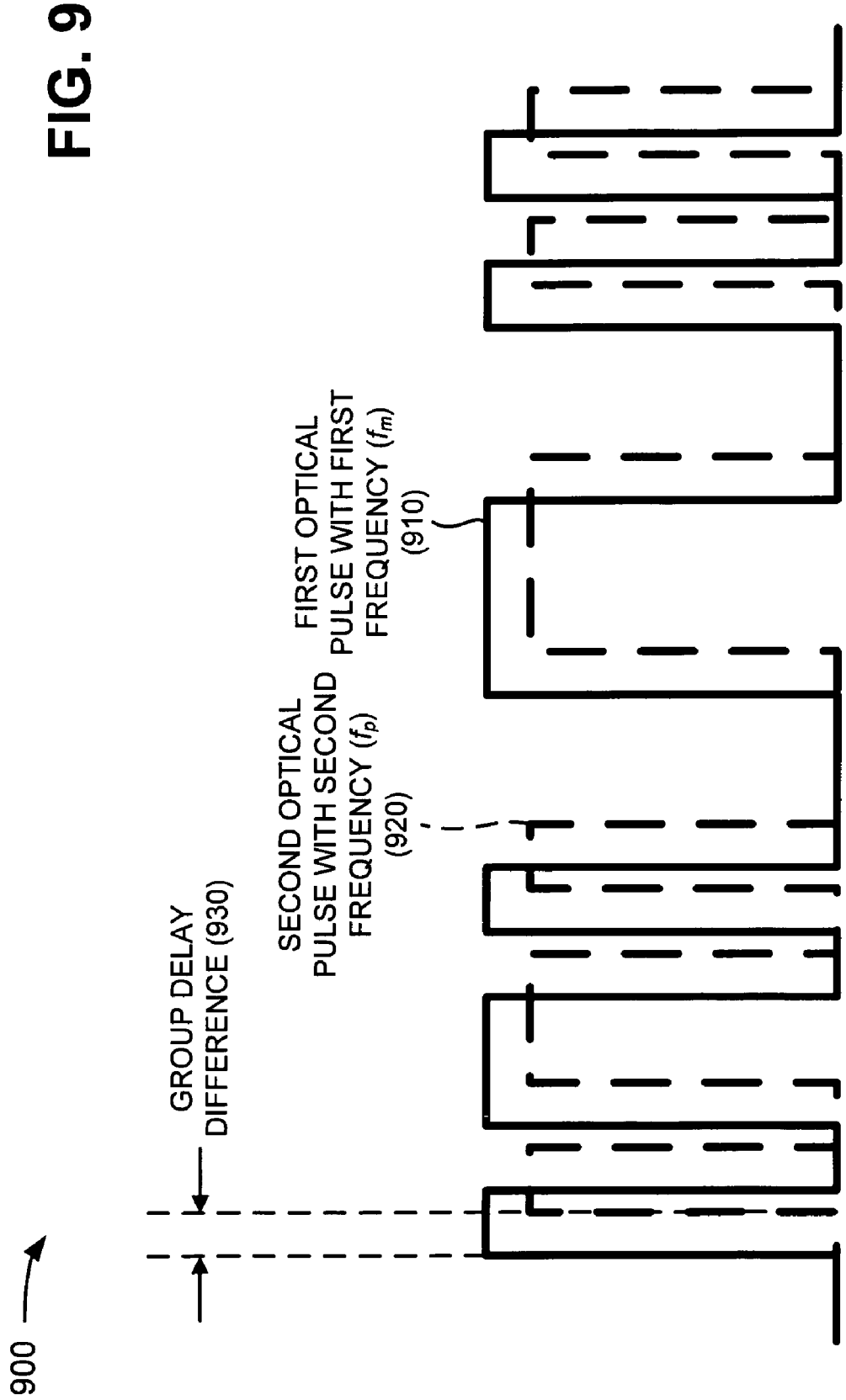

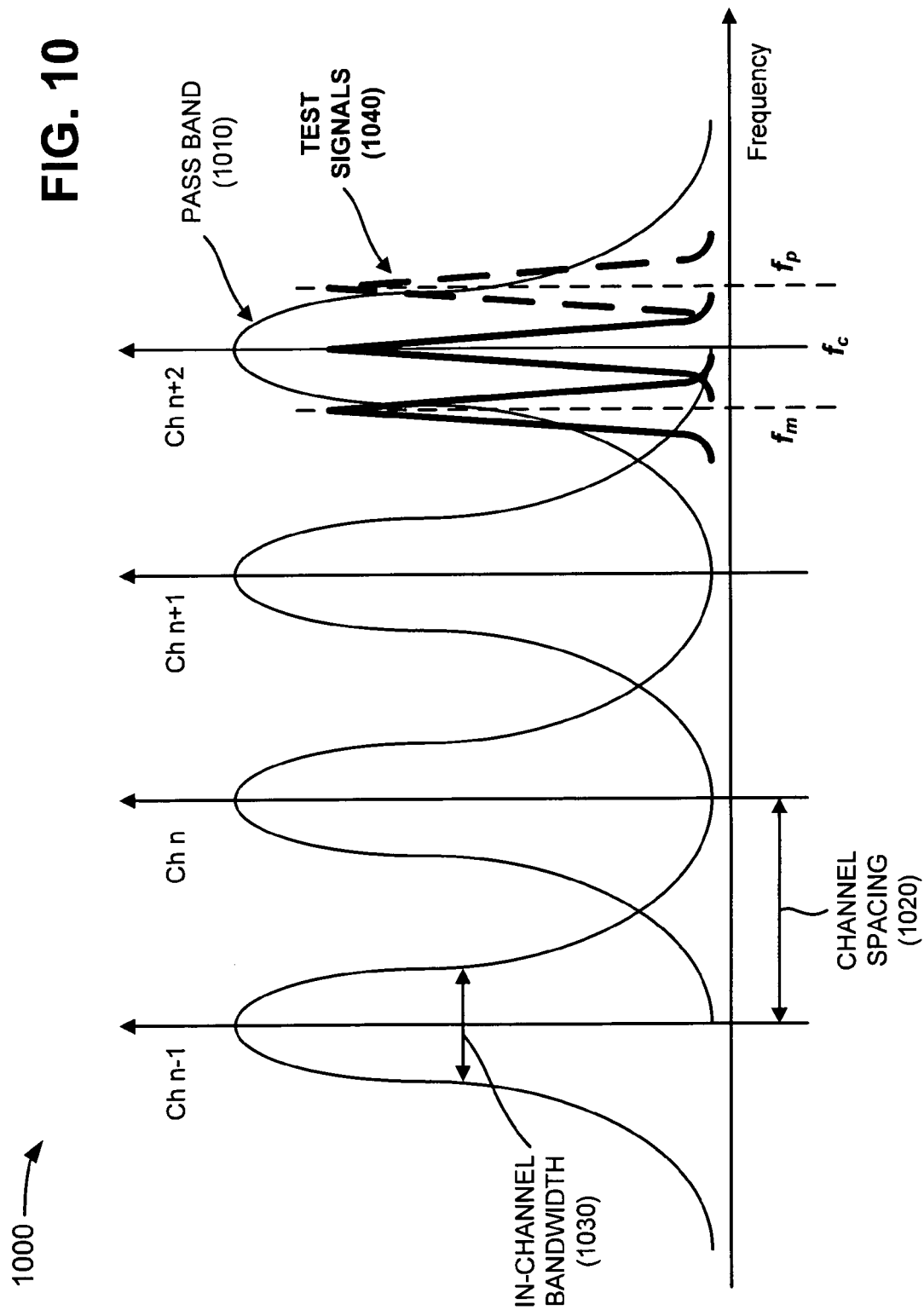

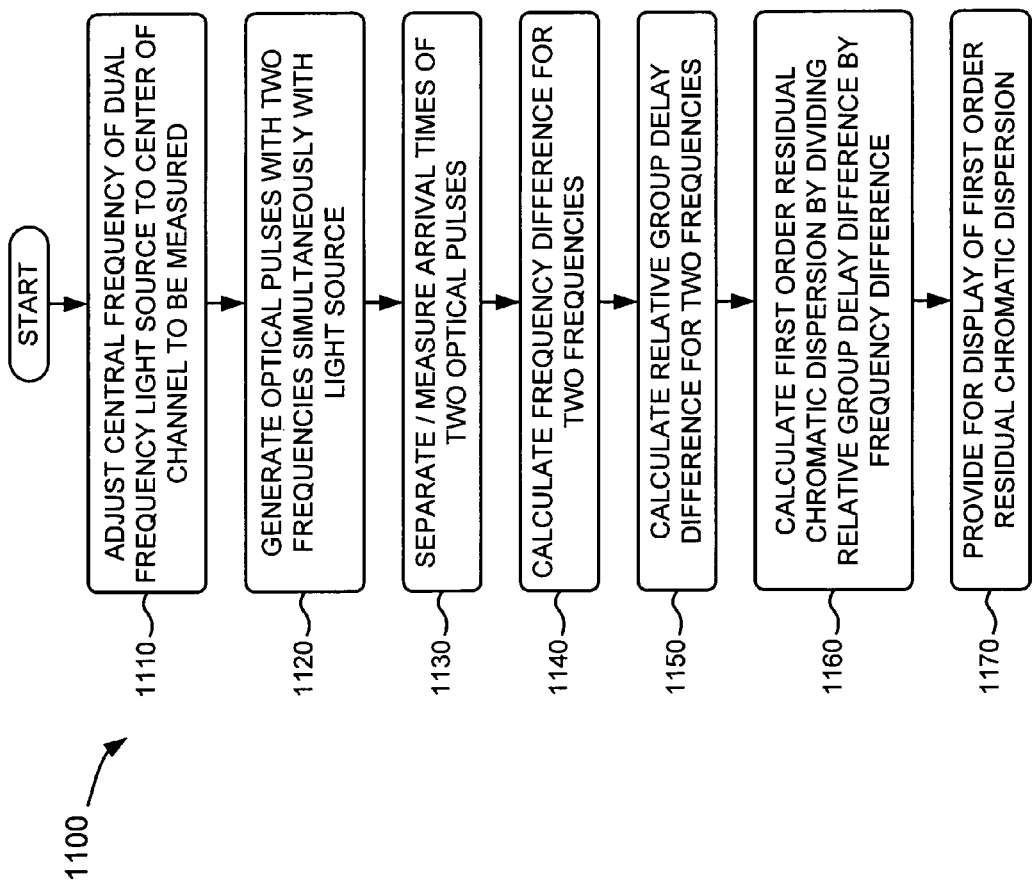

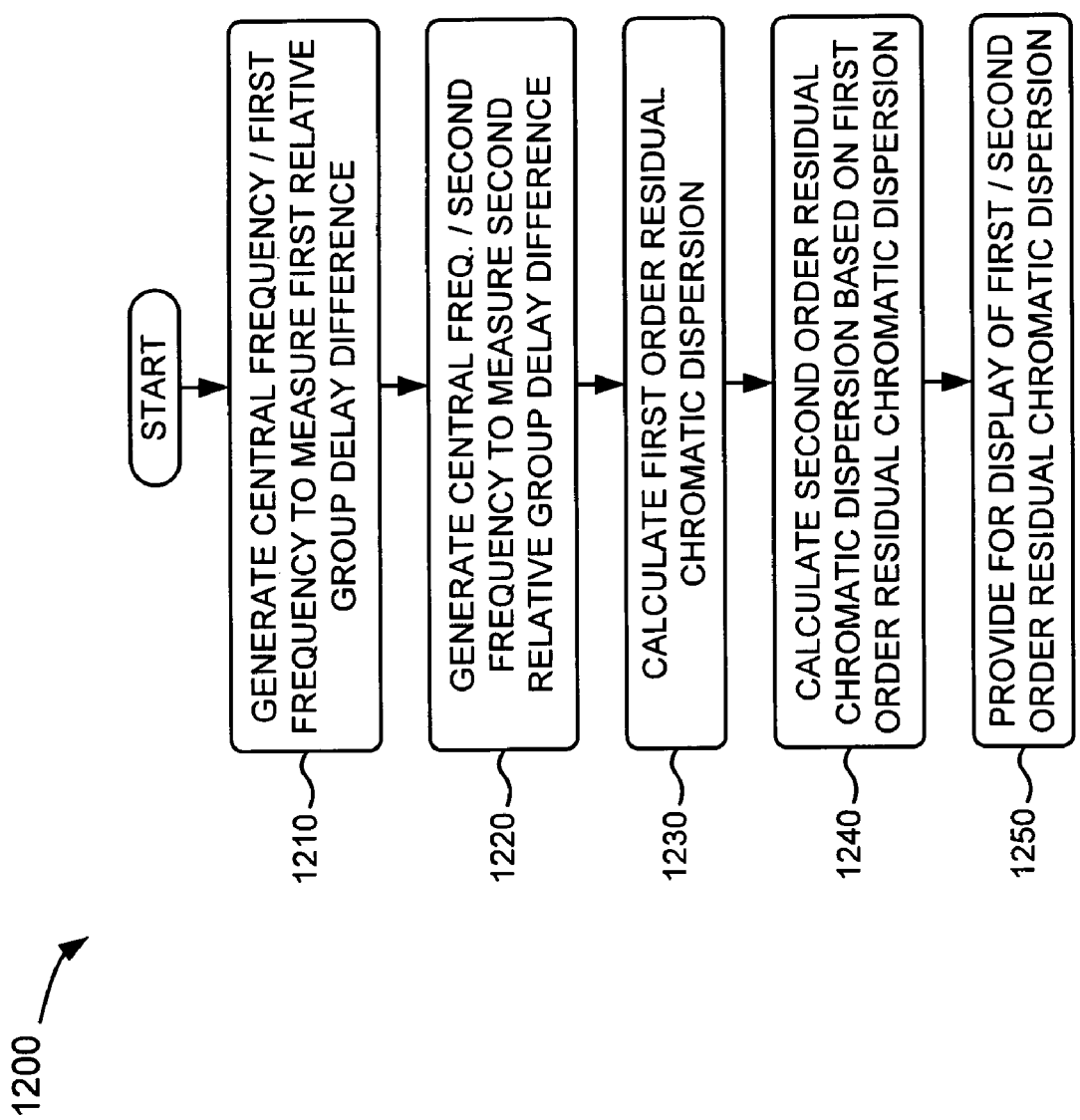

IN-CHANNEL RESIDUAL CHROMATIC DISPERSION MEASUREMENT

BACKGROUND

Telecommunications carriers typically deploy optical fibers for transmitting optical signals from one point to another. Some telecommunications carriers transmit high bit rate optical signals through such fibers for communications in long haul, ultra long haul, and/or undersea networks. In such high bit rate systems, performance of the optical fibers may depend upon a value of residual chromatic dispersion ("CD") of a channel provided through the optical fibers. Chromatic dispersion involves the "spreading" of an optical signal due to the wavelength dependence of the velocity of propagation of the optical signal. If an optical signal contains multiple wavelengths then, due to chromatic dispersion, the constituent wavelengths of the optical signal will travel at different speeds through the optical fiber and arrive at different times at the receiver, resulting in a "spreading" of the optical signal. Chromatic dispersion may occur due to the materials making up the optical fibers and/or geometries of the optical fibers. The speed of light through an optical fiber varies slightly with a wavelength or frequency of the light. Thus, each wavelength may be refracted at a slightly different angle when passing through an optical fiber. This refraction or spreading out of the light is called chromatic dispersion. For example, for networks with a transmission data rate of ten (10) gigabits per second (G/s), tolerance to residual chromatic dispersion may be approximately "1500" picoseconds (ps) per nanometer (nm) for an optical signal. However, for networks with a transmission data rate of forty (40) G/s, the tolerance to residual chromatic dispersion may be reduced to approximately "100" ps/nm.

BRIEF DESCRIPTION OF THE DRAWINGS

FIG. 2 illustrates exemplary components of a network device, a transmitter, and/or a receiver of the network depicted in FIG. 1;

FIG. 3 depicts exemplary components of the transmitter illustrated in FIG. 1;

FIG. 4 illustrates exemplary components of the receiver depicted in FIG. 1;

FIG. 5 depicts exemplary components of a tunable dual-frequency light source of the transmitter illustrated in FIG. 3 according to one implementation;

FIG. 6 depicts exemplary components of a tunable dual-frequency light source of the transmitter illustrated in FIG. 3 according to another implementation;

FIG. 7 illustrates an exemplary spectral arrangement diagram capable of being generated and/or received by the transmitter and/or the receiver of the network depicted in FIG. 1;

FIGS. 8A and 8B are exemplary diagrams depicting how the receiver may detect a group delay difference for two optical pulses simultaneously;

FIG. 9 is an exemplary diagram illustrating how the receiver may detect a group delay difference for a patterned pulse chain;

FIG. 10 illustrates an exemplary spectral arrangement (for a second order chromatic dispersion) diagram capable of being generated and/or received by the receiver of the network depicted in FIG. 1; and FIGS. 11 and 12 depict flow charts of exemplary processes according to implementations described herein.

DETAILED DESCRIPTION OF PREFERRED EMBODIMENTS

Figure 1:
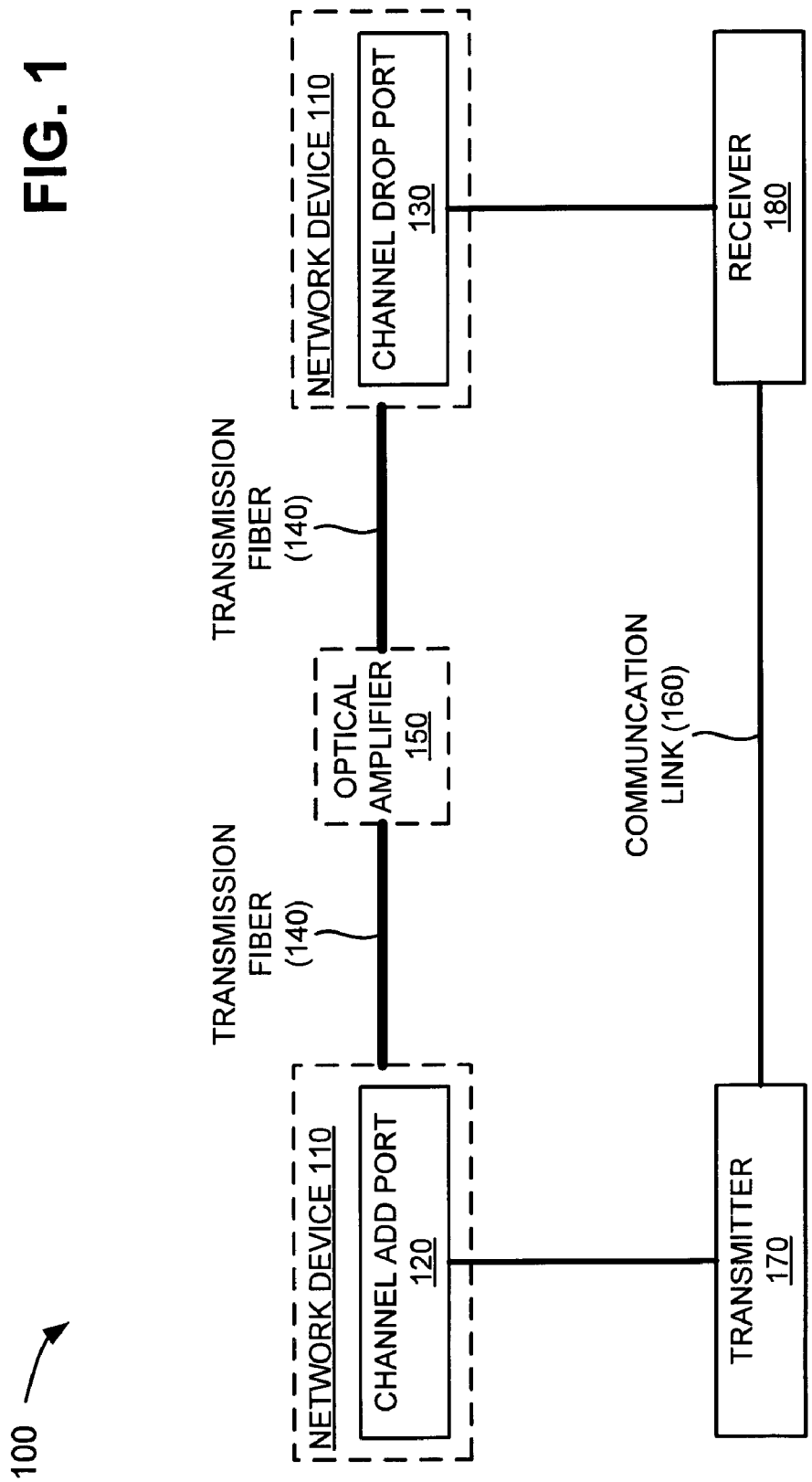
FIG. 1 is an exemplary diagram of a network in which systems and methods described herein may be implemented.

The following detailed description refers to the accompanying drawings. The same reference numbers in different drawings may identify the same or similar elements. Also, the following detailed description does not limit the invention.

As higher bit rate transmission becomes more popular, test devices are needed to measure the residual chromatic dispersion within a channel to aid installation and trouble shooting. However, existing test devices are unable to measure a residual chromatic dispersion in a Dense Wavelength Division Multiplexing (DWDM) (e.g., an optical technology used to increase bandwidth over existing fiber optic backbones) channel of a DWDM-based network because a total useable bandwidth in the DWDM channel is too narrow. For example, a channel may be "50" gigahertz (GHz) channel spaced, and may have a useable bandwidth of less than "25 GHz (i.e., less than "0.2" nm). While a smallest available wavelength step may be "0.2" nm for a test set, the test device may experience accuracy issues if residual chromatic dispersion is measured within a very small spectral range. Existing test devices are also unable to perform residual chromatic dispersion measurement of multiple channels because uncertain physical delays in optical components of a network severely impact measurement accuracy.

Implementations described herein may measure in-channel residual chromatic dispersion for an optical fiber based system (e.g., a high bit rate-based network, a DWDM-based network, etc.). For example, in one implementation, two optical pulses may be generated at two frequencies/wavelengths within a DWDM channel at a transmission end of an optical transmission system, and the arrival times, and their frequencies, may be measured at a receive end of the optical transmission system. A frequency difference may be calculated or set for the two frequencies of the optical pulses, and a relative group delay difference may also be calculated for the two optical pulses. A first order residual chromatic dispersion may be calculated by dividing the relative group delay difference by the frequency difference. Systems and methods described herein may also be used to calculate higher order residual chromatic dispersion values, and may enable a user (e.g., a field tester for a telecommunications provider) to determine the residual chromatic dispersion in a DWDM channel quickly and accurately.

FIG. 1 is an exemplary diagram of a network 100 in which systems and methods described herein may be implemented. As illustrated, network 100 may include a network device 110 (e.g., that includes a channel add port 120) and another network device 110 (e.g., that includes a channel drop port 130), interconnected via transmission fibers 140 and an optical amplifier 150. Network 100 may further include a communication link 160 between a transmitter 170 connected to channel add port 120 and a receiver 180 connected to channel drop port 130. Two network devices, two transmission fibers, a single optical, a transmitter, and a single receiver have been illustrated in FIG. 1 for simplicity. In practice, there may be different, more, or less network devices, transmission fibers, optical amplifiers, transmitters, and/or receivers. Also, in some instances, one of network devices 110 may perform one or more functions described as being performed by another one of network devices 110. In one implementation, network devices 110, transmission fibers 140, and optical amplifier 150 may form a DWDM-based network, a high bit rate-based network, etc. In other implementations, network devices 110, transmission fibers 140, and optical amplifier 150 may form other types of optical-based networks. Furthermore, network devices 110 and/or optical amplifier 150 may be omitted from network 100, transmitter 170 may connect to a transmission end of an optical transmission system (e.g., transmission fiber 140), and receiver 180 may connect to a receive end of the optical transmission system (e.g., transmission fiber 140).

Each of network devices 110 may include a data transfer device, such as a gateway, a router, a switch, a firewall, a network interface card (NIC), a hub, a bridge, a proxy server, an optical add-drop multiplexer (OADM), or some other type of device that processes and/or transfers data. In one example, each of network devices 110 may be capable of establishing a channel that optically communicates information between channel add port 120 and channel drop port 130.

Channel add port 120 may include a port that enables network device 110 to add one or more wavelength channels to an existing optical signal (e.g., an existing multi-wavelength WDM signal), and to transmit optical signals to transmission fiber 140.

Channel drop port 130 may include a port that enables network device 110 to de-multiplex optical signals on a channel, and/or to provide the de-multiplexed optical signals to receiver 180.

Each of transmission fibers 140 may include a connection, a coupling, a link, or other similar mechanism by which optical signals, which may be carried by one optical component, may be imparted to a communicating optical component. For example, transmission fibers 140 may permit network devices 110 to optically communicate with each other, and may permit optical signals to be transmitted between network devices 110. "Optically communicating" devices may not necessarily be directly connected to one another and may be separated by intermediate optical components or devices.

Optical amplifier 150 may include a device that amplifies an optical signal directly, without converting the optical signal into an electrical signal. In one example, optical amplifier 150 may include a gain medium that causes amplification of an incoming optical signal.

Communication link 160 may include a connection, a coupling, a link, or other similar mechanism by which transmitter 170 may communicate with receiver 180.

Transmitter 170 may include a device capable of generating optical pulses with two frequencies within a channel of an optical fiber based system (e.g., transmission fiber 140), via channel add port 120. Further details of transmitter are provided below in connection with FIGS. 3, 5, and 6

Receiver 180 may include a device capable of separating and measuring arrival times of the two optical pulses, and measuring in-channel residual chromatic dispersion for an optical fiber based system (e.g., transmission fiber 140). Receiver 180 may calculate or set a frequency difference for the two frequencies of the optical pulses, and may calculate a relative group delay difference between the two optical pulses. Receiver 180 may also calculate a first order residual chromatic dispersion by dividing the relative group delay difference by the frequency difference, and may display the calculated first order residual chromatic dispersion. Further details of receiver 180 are provided below in connection with FIG. 4.

Although transmitter 170 and receiver 180 are shown as being separate devices, in other implementations, transmitter 170 and receiver 180 may be combined within a single device.

Although FIG. 1 shows exemplary components of network 100, in other implementations, network 100 may contain fewer, different, or additional components than depicted in FIG. 1.

FIG. 2 is an exemplary diagram of a device 200 that may correspond to network devices 110, transmitter 170, and/or receiver 180. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/ or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 100.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

FIG. 3 depicts exemplary components of transmitter 170. As illustrated, transmitter 170 may include a tunable dual-frequency light source 300, a driver 310, and an optical modulator 320.

Tunable dual-frequency light source 300 may include a laser source (e.g., a gas laser, a chemical laser, a dye laser, a metal-vapor laser, a solid-state laser, a semiconductor laser, other types of lasers, etc.) that is capable of generating continuous wave (CW) optical signals at two frequencies (e.g., within a channel between network devices 110). Tunable dual-frequency light source 300 may adjust or tune the two frequencies associated with the CW signals so that a variety of frequencies may be selected and generated by tunable dual-frequency light source 300. Tunable dual-frequency light source 300 may tune the optical pulses to frequencies that are less than, or greater than, a channel center frequency (e.g., a nominal channel frequency/wavelength or "central frequency"). Tunable dual-frequency light source 300 may be capable of tuning the central frequency to any DWDM channel (e.g., to a center of a DWDM channel).

Driver 310 may output a variety of operating frequencies and a variety of power levels for controlling optical modulator 320. In one implementation, driver 310 may produce a stable and accurate radio frequency signal that may be used to drive optical modulator 320.

Optical modulator 320 may include a device in which a signal-controlled element may be used to modulate a CW beam of light to generate one or more optical pulses. In one implementation, optical modulator 320 may interact with tunable dual-frequency light source 300 and/or driver 310 to generate optical pulses 330, each having different frequencies (e.g., within a channel between network devices 110). Optical pulses 330 may be provided to channel add port 120 of network device 110. Tunable light source 300 and optical modulator 320 may generate two optical pulses simultaneously and/or with a known time difference (e.g., so that receiver 180 may measure arrival times with a high degree of accuracy). In one implementation, each of the optical pulses generated by tunable dual-frequency light source 300 and optical modulator 320 may include a pulse width of about one nanosecond and a rise time of about one-hundred picoseconds.

In other implementations, tunable dual-frequency light source 300 and optical modulator 320 may generate multiple optical pulses (e.g., more than two), each having a different frequency, within a channel as long as the frequencies can be accurately set. This may enable higher order residual chromatic dispersion values to be measured based on lower order residual chromatic dispersion values. Further details of tunable dual-frequency light source 300 are provided below in connection with FIGS. 5 and 6.

Although FIG. 3 shows exemplary components of transmitter 170, in other implementations, transmitter 170 may contain fewer, different, or additional components than depicted in FIG. 3. In still other implementations, one or more components of transmitter 170 may perform one or more other tasks described as being performed by one or more other components of transmitter 170.

FIG. 4 illustrates exemplary components of receiver 180. As illustrated, receiver 180 may include an interferometer 400, optical diodes 410, a residual chromatic dispersion calculator 420, and/or a user interface 430.

Interferometer 400 may include a Fabry-Perot interferometer, an etalon (e.g., a device with a transparent plate with two reflecting surfaces, a device with two flat, parallel mirrors, a device with two spherical mirrors with their concave sides facing each other and being spaced a distance equal to each mirror's radius of curvature, etc.), etc. In one implementation, interferometer 400 may receive optical pulses 330 (e.g., from channel drop port 130), may separate optical pulses 330 by wavelength, and may provide optical pulses of different wavelengths to different ones of diodes 410.

Each of optical diodes 410 may include, for example, a photodetector (e.g., a positive intrinsic negative (PIN) diode, an avalanche photodetector (APD), and/or a photo-multiplier tube (PMT)) which acts to convert optical pulses into electrical pulses. In one implementation, one optical diode 410 may receive a first optical pulse at a first frequency from interferometer 400, and the other optical diode 410 may receive a second optical pulse at a second frequency from interferometer 400. Optical diodes 410 may convert the received optical pulses into corresponding electrical signals, and may provide the electrical pulses to residual chromatic dispersion calculator 420.

Residual chromatic dispersion calculator 420 may include any hardware and/or software based logic (e.g., processing logic 220) that enables receiver 180 to calculate residual chromatic dispersion (e.g., associated with network devices 110, transmission fibers 140, etc.). In one implementation, residual chromatic dispersion calculator 420 may receive the electrical pulses (e.g. with the first and second frequency information) from optical diodes 410, and may calculate a frequency difference (e.g., a difference in the wavelength of the light that makes up each optical pulse) for the two frequency signals. For example, residual chromatic dispersion calculator 420 may calculate a frequency difference that fits a typical DWDM-based network (e.g., a frequency difference of twenty GHz may produce a measurement uncertainty due to timing of about five ps/nm). Since interferometer 400 ensures a frequency difference of about 0.1 GHz, an uncertainty due to frequency difference error may be negligible. Although not shown in FIG. 4, residual chromatic dispersion calculator 420 and/or receiver 180 may include one or more mechanisms (e.g., a frequency counter) for measuring frequencies of the two frequency signals. In other implementations, frequency information may be measured by transmitter 170 (e.g., with a frequency counter), and may be transmitted across transmission fiber 140 to receiver 180.

Residual chromatic dispersion calculator 420 may calculate a relative group delay difference (e.g., in an optical fiber, the transit time required for optical power, traveling at a given mode's group velocity, to travel a given distance) for the two frequency signals, and may calculate a first order residual chromatic dispersion (e.g., associated with network devices 110, transmission fibers 140, etc.) by dividing the calculated relative group delay difference by the calculated frequency difference. Residual chromatic dispersion calculator 420 may provide the calculated first order residual chromatic dispersion to user interface 430.

User interface 430 may include a graphical user interface (GUI) or a non-graphical user interface, such as a text-based interface. User interface 430 may provide information to users (e.g., a user of receiver 180) via a customized interface (e.g., a proprietary interface) and/or other types of interfaces (e.g., a browser-based interface). User interface 430 may receive user inputs via one or more input devices (e.g., input device 260), may be user configurable (e.g., a user may change the size of user interface 430, information displayed in user interface 430, color schemes used by user interface 430, positions of text, images, icons, windows, etc., in user interface 430, etc.), and/or may not be user configurable. User interface 430 may be displayed to a user via one or more output devices (e.g., output device 270). In one implementation, user interface 430 may receive the calculated first order residual chromatic dispersion from residual chromatic dispersion calculator 420, and may display the calculated first order residual chromatic dispersion.

Such an arrangement may enable receiver 180 to simultaneously measure group delays of two slightly separated optical pulses in order to obtain an accurate relative group delay difference. In contrast, conventional test devices require scanning, which produces group delay fluctuation issues. Interferometer 400 may ensure receipt of signals with accurate frequency difference calculation and simultaneous measurements. Receiver 180 may also provide accurate residual chromatic dispersion measurement with an estimated uncertainty of less than five ps/nm, which is more than sufficient for high bit rate (e.g., forty and one-hundred G/s) signals. In contrast, conventional test devices are incapable providing accurate residual chromatic dispersion measurements for a very small frequency range, such as within a DWDM channel.

Although FIG. 4 shows exemplary components of receiver 180, in other implementations, receiver 180 may contain fewer, different, or additional components than depicted in FIG. 4. In still other implementations, one or more components of receiver 180 may perform one or more other tasks described as being performed by one or more other components of receiver 180.

FIG. 5 depicts exemplary components of tunable dual-frequency light source 300 of transmitter 170 according to one implementation. As illustrated, tunable dual-frequency light source 300 may include a light source 500, a highly reflective mirror 505, a gain medium 510, an interferometer 520, a tunable filter 530, reverse saturable absorber 540, an output coupler 550, a beam splitter 560, and a wavelength locker 570.

Light source 500 may include one or more laser sources (e.g., a gas laser, a chemical laser, a dye laser, a metal-vapor laser, a solid-state laser, a semiconductor laser, other types of lasers, etc.) that are capable of generating continuous wave (CW) optical signals at two frequencies. Light source 500 may be associated with an optical modulator (not shown) that may pulse the CW light from light source 500 to create optical pulses.

Highly reflective mirror 505 may include any mirror with one or more highly reflective (e.g., more than 99% reflective) surfaces. For example, highly reflective mirror 505 may include a dielectric mirror, a uranium mirror, a laser cavity mirror, etc. Highly reflective mirror 505 may reflect light (e.g., an optical signal or pulse) generated by light source 500 to gain medium 510.

Gain medium 510 may include a material that exhibits optical gain (e.g., gain generated by stimulated emission on electronic or molecular transitions to a lower energy state, starting from a higher energy state to which it had been previously stimulated). For example, gain medium 510 may include a crystal material (e.g., neodymium, ytterbium, or erbium), a glass material (e.g., silicate or phosphate glasses), a gaseous material (e.g., mixtures of helium and neon, nitrogen, etc.), a semiconductor material (e.g., gallium arsenide, gallium nitride, etc.), etc. Gain medium 510 may receive the optical pulses reflected by highly reflected mirror 505, and may provide optical gains for the optical pulses. Gain medium 510 may provide the optical pulses to interferometer 520.

Interferometer 520 may include a Fabry-Perot interferometer, an etalon (e.g., a device with a transparent plate with two reflecting surfaces, a device with two flat, parallel mirrors, a device with two spherical mirrors with their concave sides facing each other and being spaced a distance equal to each mirror's radius of curvature, etc.), etc. In one example, interferometer 520 may receive the optical pulses from gain medium 510, may separate the optical pulses by wavelength (e.g., by two frequencies), and may provide optical pulses of different frequencies to tunable filter 530.

Tunable filter 530 may include any device capable of optically tuning optical signals. In one implementation, tunable filter 530 may include an optical filter that selectively transmits or receives light having certain properties (e.g., a particular range of wavelengths), while blocking the remainder of the light. For example, tunable filter 530 may receive the optical pulses with two frequencies from interferometer 520, and may tune the optical pulses to a particular channel (e.g., a channel between network devices 110). Tunable filter 530 may provide the tuned optical pulses with two frequencies to reverse saturable absorber 540.

Reverse saturable absorber 540 may include a material with an excited-state absorption cross section larger than the ground-state absorption cross section, where increasing an incident light intensity increases the absorption. For example, reverse saturable absorber 540 may receive the tuned optical pulses from tunable filter 530, and may maintain an oscillation of the tuned optical pulses. Reverse saturable absorber 540 may provide the tuned optical pulses to output coupler 550.

Output coupler 550 may include an optical device that couples two optical signals into a single output fiber. For example, output coupler 550 may receive tuned optical pulses from reverse satiable absorber 540, and may couple or combine the tuned optical pulses into a single fiber. Output coupler 550 may provide the tuned optical pulses to beam splitter 560.

Beam splitter 560 may include an optical device that splits a beam of light in two. Beam splitter 560 may receive the tuned optical pulses from output coupler 550, and may split the tuned optical pulses into first tuned optical pulses 580 and second tuned optical pulses 590. Beam splitter 560 may output first tuned optical pulses 580 as optical pulses with two frequencies (e.g., a first frequency $f_m$ and a second frequency $f_p$). Beam splitter 560 may provide second tuned optical pulses 590 to wavelength locker 570.

Wavelength locker 570 may include a device that may used to stabilize a wavelength of tunable dual-frequency light source 300. For example, wavelength locker 570 may stabilize a channel wavelength to a standard wavelength used in DWDM-based networks. Wavelength locker 570 may receive second tuned optical pulses 590 from beam splitter 560, and may stabilize a wavelength (e.g., and frequency, which is inversely proportional to wavelength) of tunable dual-frequency light source 300 based on second tuned optical pulses 590 (e.g., via adjustments to interferometer 520 and/or tunable filter 530).

Although FIG. 5 shows exemplary components of tunable dual-frequency light source 300, in other implementations, tunable dual-frequency light source 300 may contain fewer, different, or additional components than depicted in FIG. 5. In still other implementations, one or more components of tunable dual-frequency light source 300 may perform one or more other tasks described as being performed by one or more other components of tunable dual-frequency light source 300.

FIG. 6 depicts exemplary components of tunable dual-frequency light source 300 of transmitter 170, according to another implementation. As illustrated, tunable dual-frequency light source 300 may include a first tunable light source 600-1, a second tunable light source 600-2, a first beam splitter 610-1, a second beam splitter 610-2, a wavelength locker 620, and a beam coupler 630.

Each of first tunable light source 600-1 and second tunable light source 600-2 may include a laser source (e.g., a gas laser, a chemical laser, a dye laser, a metal-vapor laser, a solid-state laser, a semiconductor laser, other types of lasers, etc.) that is capable of generating a CW optical signal at a selected frequency. In one implementation, first tunable light source 600-1 may generate a CW optical signal with a first frequency, and second tunable light source 600-2 may generate a CW optical signal with a second frequency (e.g., different than the first frequency). First tunable light source 600-1 may provide the first frequency CW beam of light to beam splitter 610-1, and second tunable light source 600-2 may provide the second frequency optical pulse to beam splitter 610-2.

Each of first beam splitter 610-1 and second beam splitter 610-2 may include an optical device that duplicates a beam of light. First beam splitter 610-1 may receive the first frequency optical pulse from first tunable light source 600-1, and may duplicate the first frequency optical pulse. First beam splitter 610-1 may provide the first frequency optical pulse to wavelength locker 620, and may provide the duplicate first frequency optical pulse to beam coupler 630. Second beam splitter 610-2 may receive the second frequency optical pulse from second tunable light source 600-2, and may duplicate the second frequency optical pulse. Second beam splitter 610-2 may provide the second frequency optical pulse to wavelength locker 620, and may provide the duplicate second frequency optical pulse to beam coupler 630.

Wavelength locker 620 may include a device that may used to stabilize a wavelength of tunable dual-frequency light source 300. For example, wavelength locker 620 may stabilize a channel wavelength to a standard wavelength used in DWDM-based networks. Wavelength locker 620 may receive portions of the first and second frequency optical pulses from first beam splitter 610-1 and second beam splitter 610-2, and may stabilize a wavelength (e.g., and frequency, which is inversely proportional to wavelength) of tunable dual-frequency light source 300 based on the received portions of the first and second frequency optical pulses (e.g., via adjustments to first tunable light source 600-1 and/or second tunable light source 600-2).

Beam coupler 630 may include a device that combines one or more optical signals into a single optical signal. For example, beam coupler 630 may receive the first and second frequency optical signals from first beam splitter 610-1 and second beam splitter 610-2, and may combine the first and second frequency optical signals into optical signals 640 with two frequencies (e.g., a first frequency $f_m$ and a second frequency $f_p$).

Although FIG. 6 shows exemplary components of tunable dual-frequency light source 300, in other implementations, tunable dual-frequency light source 300 may contain fewer, different, or additional components than depicted in FIG. 6. In still other implementations, one or more components of tunable dual-frequency light source 300 may perform one or more other tasks described as being performed by one or more other components of tunable dual-frequency light source 300.

FIG. 7 illustrates an exemplary spectral arrangement diagram 700 capable of being generated and/or received by transmitter 170 and/or receiver 180. As illustrated, spectral arrangement diagram 700 may include a horizontal frequency axis (e.g., "Frequency"), multiple vertical channel axes (e.g., "Ch n−1," "Ch n," "Ch n+1," and "Ch n+2") that may define multiple channels (e.g., provided between network devices 110), a pass band 710, a channel spacing 720, an in-channel bandwidth 730, test signals 740, and a frequency difference 750.

Pass band 710 may include a total bandwidth associated with a particular channel (e.g., a range of acceptable frequencies in which optical signals may be received in a channel). Channel spacing 720 may include the spacing between adjacent channels (e.g., channels "Ch n−1," "Ch n," "Ch n+1," and "Ch n+2") provided between network devices 110. In-channel bandwidth 730 may include a bandwidth that is associated with each channel.

Test signals 740 may include optical pulses (e.g., generated and/or received by transmitter 170/receiver 180) each of which may have a different frequency (e.g., a first frequency $f_m$ and a second frequency $f_p$). In one implementation, test signals 740 may depict the optical pulses received by receiver 180. Frequency difference 750 may include a difference between the first frequency $f_m$ and the second frequency $f_p$ of test signals 740.

Although FIG. 7 shows exemplary elements of spectral arrangement diagram 700, in other implementations, spectral arrangement diagram 700 may contain fewer, different, or additional elements than depicted in FIG. 7. In one example, exemplary diagram 700 may provide wavelength-based information instead of or in addition to the frequency-based information.

FIGS. 8A and 8B are exemplary diagrams 800 depicting how receiver 180 may detect a group delay difference between two optical pulses. Transmitter 170 may generate optical pulses that include a first frequency ($f_m$) 810 and a second frequency ($f_p$) 820, as illustrated in FIG. 8A. First optical pulse with a first frequency ($f_m$) 810 and second optical pulse with a second frequency ($f_p$) 820 may be generated simultaneously and/or with a known time difference (e.g., so that receiver 180 may measure arrival times with a high degree of accuracy). The optical pulses may be provided to channel add port 120 of network device 110, may be transmitted to channel drop port 130 of network device 110 (e.g., via transmission fibers 140, optical amplifier 150, etc.), and may be received by receiver 180.

An arrival time between first frequency ($f_m$) 810 and second frequency ($f_p$) 820 of the optical pulses received by receiver 180 may be offset from each other by a relative group delay difference 830, as illustrated in FIG. 8B. Relative group delay difference 830 may provide a measure of a transit time for the optical pulses to travel a given distance (e.g., between network devices 110). Receiver 180 may use the measured relative group delay difference 830 to calculate a residual chromatic dispersion (e.g., associated with network devices 110, transmission fibers 140, etc.).

Although FIGS. 8A and 8B show exemplary elements of exemplary diagrams 800, in other implementations, exemplary diagrams 800 may contain fewer, different, or additional elements than depicted in FIGS. 8A and 8B. In one example, exemplary diagrams 800 may provide wavelength-based information instead of or in addition to the frequency-based information.

FIG. 9 is an exemplary diagram 900 illustrating how receiver 180 may detect a group delay difference for a patterned pulse chain. Transmitter 170 may generate a patterned optical pulse chain that includes a first optical pulse with a first frequency ($f_m$) 910 and a second optical pulse with a second frequency ($f_p$) 920. First optical pulse with first frequency ($f_m$) 910 and second optical pulse with second frequency ($f_p$) 920 may be generated simultaneously and/or with a known time difference (e.g., so that receiver 180 may measure arrival times with a high degree of accuracy). The patterned optical pulse chain may be provided to channel add port 120 of network device 110, may be transmitted to channel drop port 130 of network device 110 (e.g., via transmission fibers 140, optical amplifier 150, etc.), and may be received by receiver 180 (e.g., as the waveforms depicted in FIG. 9).

First frequency ($f_m$) 910 and second frequency ($f_p$) 920 of the patterned optical pulse chain received by receiver 180 may be offset from each other by a relative group delay difference 930, as illustrated in FIG. 9. Relative group delay difference 930 may provide a measure of a transit time for the patterned optical pulse chain to travel a given distance (e.g., between network devices 110). Receiver 180 may use the measured relative group delay difference 930 to calculate a residual chromatic dispersion (e.g., associated with network devices 110, transmission fibers 140, etc.).

Although FIG. 9 shows exemplary elements of exemplary diagram 900, in other implementations, exemplary diagram 900 may contain fewer, different, or additional elements than depicted in FIG. 9. In one example, exemplary diagram 900 may provide wavelength-based information instead of or in addition to the frequency-based information.

FIG. 10 illustrates an exemplary spectral arrangement diagram 1000 (for a second order chromatic dispersion) capable of being generated and/or received by transmitter 170/receiver 180. As illustrated, spectral arrangement diagram 1000 may include a horizontal frequency axis (e.g., "Frequency"), multiple vertical channel axes (e.g., "Ch n−1," "Ch n," "Ch n+1," and "Ch n+2") that may define multiple channels (e.g., provided between network devices 110), a pass band 1010, a channel spacing 1020, an in-channel bandwidth 1030, and test signals 1040.

Pass band 1010 may include a total bandwidth associated with a particular channel (e.g., a range of acceptable frequencies in which optical signals may be received in a channel). Channel spacing 1020 may include the spacing between adjacent channels (e.g., channels "Ch n−1," "Ch n," "Ch n+1," and "Ch n+2") provided between network devices 110. In-channel bandwidth 1030 may include a bandwidth that is associated with each channel.

Test signals 1040 may include optical pulses (e.g., generated and/or received by transmitter 170/receiver 180) each of which may have a different frequency (e.g., a first frequency $f_m$ and a second frequency $f_p$) as well as a central frequency ($f_c$) that may be tuned to a channel (e.g., channel "Ch n+2"). In one implementation, test signals 1040 may depict the optical pulses received by receiver 180. Transmitter 170 may generate the first frequency $f_m$ and the central frequency $f_c$ to measure a first relative group delay difference, and may generate the second frequency $f_p$ and the central frequency $f_c$ to measure a second relative group delay difference. Receiver 180 may calculate a first order residual chromatic dispersion based on the first and second relative group delay differences, and may calculate a second order residual chromatic dispersion based on the first order residual chromatic dispersion. Receiver 180 (e.g., via output device 270 and/or user interface 430) may display the first order residual chromatic dispersion and/or the second order residual chromatic dispersion.

Although FIG. 10 shows exemplary elements of spectral arrangement diagram 1000, in other implementations, spectral arrangement diagram 1000 may contain fewer, different, or additional elements than depicted in FIG. 10. In one example, exemplary diagram 1000 may provide wavelength-based information instead of or in addition to the frequency-based information.

FIG. 11 depicts a flow chart of an exemplary process 1100 for measuring residual chromatic dispersion of a channel provided between one or more network devices 110 of a network (e.g., network 100) according to implementations described herein. In one implementation, process 1100 may be performed by transmitter 170/receiver 180. In other implementations, process 1100 may be performed by transmitter 170/receiver 180 in conjunction with another device (e.g., a computing device, such as a laptop, a personal computer, etc.).

As illustrated, process 1100 may begin with adjustment of a central frequency of a dual-frequency light source to a center of a channel to be measured (block 1110), and generation of optical pulses with two frequencies simultaneously with the dual-frequency light source (block 1120). For example, in one implementation described above in connection with FIG. 3, tunable dual-frequency light source 300 of transmitter 170 may generate CW optical signals at two frequencies (e.g., within a channel between network devices 110). Tunable dual-frequency light source 300 may adjust or tune the two frequencies associated with the CW signals so that a variety of frequencies may be selected and generated by tunable dual-frequency light source 300. Tunable dual-frequency light source 300 may tune the optical pulses to frequencies that are less than, or greater than, a channel center frequency (e.g., a nominal channel frequency/wavelength or "central frequency"). Tunable dual-frequency light source 300 may be capable of tuning the central frequency to any DWDM channel (e.g., to a center of a DWDM channel). The two optical pulses may be generated simultaneously and/or with a known time difference (e.g., so that receiver 180 may measure arrival times with a high degree of accuracy).

As further shown in FIG. 11, the two frequencies of the optical pulses may be separated and arrival times of the two frequencies may be measured (block 1130), and a frequency difference for the optical pulses may be calculated or set (block 1140). For example, in one implementation described above in connection with FIG. 4, interferometer 400 of receiver 180 may receive optical pulses 330 (e.g., from channel drop port 130), may separate optical pulses 330 by wavelength, and may provide optical pulses of different wavelengths to different ones of diodes 410. Residual chromatic dispersion calculator 420 of receiver 180 may receive the electrical pulses (e.g. with the first and second frequency information) from optical diodes 420, and may calculate a frequency difference (e.g., a difference in the wavelength of the light that makes up each optical pulse) for the two frequency signals. Residual chromatic dispersion calculator 420 and/or receiver 180 may include one or more mechanisms (e.g., a frequency counter) for measuring frequencies of the two frequency signals. In another example, frequency information may be measured by transmitter 170 (e.g., with a frequency counter), and may be transmitted across transmission fiber 140 to receiver 180.

Returning to FIG. 11, a relative group delay difference may be calculated for the two frequencies (block 1150), a first order residual chromatic dispersion may be calculated by dividing the relative group difference by the frequency difference (block 1160), and the first order residual chromatic dispersion may be provided for display (block 1170). For example, in one implementation described above in connection with FIG. 4, residual chromatic dispersion calculator 420 may calculate the relative group delay difference, and may calculate a first order residual chromatic dispersion (e.g., associated with network devices 110, transmission fibers 140, etc.) by dividing the calculated relative group delay difference by the calculated frequency difference. Residual chromatic dispersion calculator 420 may provide the calculated first order residual chromatic dispersion to user interface 430. User interface 430 may receive the calculated first order residual chromatic dispersion from residual chromatic dispersion calculator 420, and may display the calculated first order residual chromatic dispersion.

FIG. 12 depicts a flow chart of an exemplary process 1200 for measuring residual chromatic dispersion of a channel provided between one or more network devices 110 of a network (e.g., network 100) according to implementations described herein. In one implementation, process 1200 may be performed by transmitter 170/receiver 180. In other implementations, process 1200 may be performed by transmitter 170/receiver 180 in conjunction with another device (e.g., a computing device, such as a laptop, a personal computer, etc.).

As illustrated, process 1200 may begin with generation of an optical pulse that includes a central frequency and a first frequency in order to measure a first relative group delay difference of a channel (block 1210), and generation of an optical pulse that includes the central frequency and a second frequency in order to measure a second relative group delay difference of the channel (block 1220). For example, in one implementation described above in connection with FIG. 10, test signals 1040 may include optical pulses (e.g., generated and/or received by transmitter 170/receiver 180) each of which may have a different frequency (e.g., a first frequency $f_m$ and a second frequency $f_p$) as well as a central frequency ($f_c$) that may be tuned to a channel (e.g., channel "Ch n+2"). In one example, test signals 1040 may depict the optical pulses received by receiver 180. Transmitter 170 may generate the first frequency $f_m$ and the central frequency $f_c$ to measure a first relative group delay difference, and may generate the second frequency $f_p$ and the central frequency $f_c$ to measure a second relative group delay difference.

As further shown in FIG. 12, a first order residual chromatic dispersion may be calculated based on the first and second relative group delay differences (block 1230), a second order chromatic dispersion may be calculated based on the first order residual chromatic dispersion (block 1240), and the first and second order residual chromatic dispersions may be provided for display (block 1250). For example, in one implementation described above in connection with FIG. 10, receiver 180 may calculate a first order residual chromatic dispersion based on the first and second relative group delay differences, and may calculate a second order residual chromatic dispersion based on the first order residual chromatic dispersion. Receiver 180 (e.g., via output device 270 and/or user interface 430) may display the first order residual chromatic dispersion and/or the second order residual chromatic dispersion. In another implementation, receiver 180 may calculate a first first-order residual chromatic dispersion of a channel based on the first relative group delay difference and a second first-order residual chromatic dispersion of the channel based on the second relative group delay difference. The receiver 180 may also calculate a second-order residual chromatic dispersion of the channel based on the calculated first and second first-order residual chromatic dispersions, and may calculate an average first-order residual chromatic dispersion based on the calculated first and second first-order residual chromatic dispersions. Receiver 180 may display the calculated residual chromatic dispersions.

Implementations described herein may measure in-channel residual chromatic dispersion for an optical fiber based system. For example, in one implementation, the systems and methods may generate optical pulses at two frequencies/wavelengths within a DWDM channel at a transmission end of an optical transmission system, and may separate and measure arrival times of the two optical pulses at a receive end of the optical transmission system. A frequency difference may be calculated or set for the two frequencies of the optical pulses, and a relative group delay difference may also be calculated for the two optical pulses. A first order residual chromatic dispersion may be calculated by dividing the relative group delay difference by the frequency difference. Systems and methods described herein may also be used to calculate higher order residual chromatic dispersion values, and may enable a user (e.g., a field tester for a telecommunications provider) to determine the residual chromatic dispersion in a DWDM channel quickly and accurately.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11 and 12, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    generating, by a transmitter device, optical pulses, that include two frequencies within an optical channel, where the generating includes:
        separating, by an interferometer, light into two optical pulses that each correspond to a different one of the two frequencies;
        tuning, by a tunable filter, the optical pulses to the optical channel;
        splitting, by a beam splitter, the optical pulses into two portions,
        outputting, by the beam splitter, at least a portion of the optical pulses to the optical channel;
    receiving the optical pulses from the optical channel;
    separating the two frequencies of the optical pulses within the optical channel;
    measuring arrival times of the optical pulses;
    calculating a relative group delay difference for the two frequencies of the optical pulses, based on the arrival times; and
    calculating a residual chromatic dispersion of the channel based on the frequency difference and the calculated relative group delay difference.

2. The method of claim 1, further comprising:
    providing for display of the residual chromatic dispersion.

3. The method of claim 1, where calculating the residual chromatic dispersion comprises:
    calculating the residual chromatic dispersion by dividing the calculated relative group delay difference by the frequency difference.

4. A system, comprising:
    a receiver device configured to:

receive optical pulses, that include two frequencies and a frequency difference, from a channel of an optical network, separate the two frequencies of the optical pulses within the channel, measure arrival times of the optical pulses, calculate a relative group delay difference for the two frequencies of the optical pulses, based on the arrival times, and calculate a residual chromatic dispersion of the channel based on the frequency difference and the calculated relative group delay difference; and a transmitter device configured to generate the optical pulses to the channel, where the transmitter device comprises a tunable dual-frequency light source that generates the optical pulses;

where the tunable dual-frequency light source comprises:

an interferometer that receives light and separates the light into the two frequencies of the optical pulses;

a tunable filter that receives the optical pulses from the interferometer and tunes the optical pulses to the channel; and a beam splitter that splits the optical pulses into two portions, and outputs at least a portion of the optical pulses to the channel.

5. The system of claim 4, where the transmitter device comprises:

a driver that outputs one or more operating frequencies and one or more power levels; and an optical modulator that interacts with the driver and the tunable dual-frequency light source to generate the optical pulses that includes two frequencies.

6. The system of claim 4, where the tunable dual-frequency light source comprises one of:

a gas laser;

a chemical laser;

a dye laser;

a metal-vapor laser;

a solid-state laser; or a semiconductor laser.

7. The system of claim 4, further comprising:

a user interface that provides for display of the residual chromatic dispersion of the channel.

8. The system of claim 4, where the processing logic is further configured to:

calculate the residual chromatic dispersion of the channel by dividing the calculated relative group delay difference by the frequency difference.

9. The system of claim 4, where the optical network comprises a Dense Wavelength Division Multiplexing (DWDM)-based network.

10. A device comprising:

means for generating optical pulses, that include two frequencies within an optical channel, where the means for generating include:

means for separating light into the two optical pulses that each correspond to a different one of the two frequencies, means for tuning the optical pulses to the optical channel, and means for splitting the optical pulses into two portions and outputting at least a portion of the optical pulses to the optical channel;

means for receiving the optical pulses from the optical channel;

means for separating the two frequencies of the optical pulses within the optical channel;

means for measuring arrival times of the optical pulses;

means for calculating a relative group delay difference for the two frequencies of the optical pulses, based on the arrival times; and means for calculating a residual chromatic dispersion of the channel based on the frequency difference and the calculated relative group delay difference.

11. The device of claim 10, where the means for generating further include:

means for reflecting light generated by a tunable dual-frequency light source, and means for providing an optical gain to the light reflected by the means for reflecting.

12. The device of claim 10, further comprising:

means for adjusting the means for separating and the means for tuning based on another portion of the optical pulses.

13. The device of claim 10, further comprising:

means for displaying a representation of the residual chromatic dispersion.

14. The system of claim 4, where the tunable dual-frequency light source further comprises:

an absorber that receives the optical pulses from the tunable filter and maintains oscillation of the optical pulses.

15. The system of claim 4, where the tunable dual-frequency light source further comprises:

a mirror that reflects light generated by the tunable dual-frequency light source, and a gain medium that receives the light reflected by the mirror and provides an optical gain to the light reflected by the mirror, where the light received by the interferometer is the light to which the the gain medium provides the optical gain.

16. The system of claim 15, where the tunable dual-frequency light source further comprises:

a wavelength locker that receives another portion of the optical pulses from the beam splitter and adjusts the interferometer and the tunable filter based on the other portion of the optical pulses.

17. The method of claim 1, where the generating further includes:

reflecting, by a mirror, light generated by a tunable dual-frequency light source, and providing, by a gain medium, an optical gain to the light reflected by the mirror.

18. The method of claim 1, further comprising:

adjusting, by a wavelength locker, the interferometer and the tunable filter based on another portion of the optical pulses.

* * * * *